US011654831B2

(12) United States Patent
Sinha et al.

(10) Patent No.: US 11,654,831 B2
(45) Date of Patent: May 23, 2023

(54) CONSOLE ASSEMBLY FOR A VEHICLE

(71) Applicant: Ford Global Technologies, LLC, Dearborn, MI (US)

(72) Inventors: Stuti Sinha, Novi, MI (US); Mohamed A. Elmadari, Dearborn, MI (US); Chad M. Bross, Pinckney, MI (US); Patrick T. Beaudoin, Canton, MI (US); Martin J. Drumb, St. Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 146 days.

(21) Appl. No.: 17/109,678

(22) Filed: Dec. 2, 2020

(65) Prior Publication Data
US 2022/0169181 A1 Jun. 2, 2022

(51) Int. Cl.
*B60R 7/04* (2006.01)
*B60N 3/10* (2006.01)

(52) U.S. Cl.
CPC . *B60R 7/04* (2013.01); *B60N 3/10* (2013.01)

(58) Field of Classification Search
CPC .................................. B60R 7/04; B60N 3/10
USPC .................................. 296/24.34, 1.08, 37.8
See application file for complete search history.

(56) References Cited

U.S. PATENT DOCUMENTS

| 5,106,143 | A | 4/1992 | Soeters | |
|---|---|---|---|---|
| 5,970,814 | A * | 10/1999 | Smith | B60T 7/10 74/473.15 |
| 6,267,217 | B1 * | 7/2001 | Malone | B60K 20/04 29/469 |
| 7,513,550 | B1 | 4/2009 | Abro | |
| 8,414,048 | B1 * | 4/2013 | Kwolek | B60R 13/0262 296/29 |
| 8,701,819 | B2 | 4/2014 | Pores | |
| 8,708,387 | B2 * | 4/2014 | Yamaguchi | B60R 7/04 296/24.34 |
| 9,358,881 | B1 * | 6/2016 | Quijano | B60K 20/04 |
| 9,586,534 | B2 * | 3/2017 | Buza | B60R 13/0206 |
| 10,562,446 | B2 | 2/2020 | Cannon | |
| 2015/0232043 | A1 * | 8/2015 | Buza | B60R 13/0206 296/1.08 |

FOREIGN PATENT DOCUMENTS

DE    102012013717 A1    1/2014

* cited by examiner

*Primary Examiner* — D Glenn Dayoan
*Assistant Examiner* — E Turner Hicks
(74) *Attorney, Agent, or Firm* — Vichit Chea; Price Heneveld LLP

(57) ABSTRACT

A console assembly for a vehicle includes a unitary main body. The unitary main body includes a first side wall, a second side wall, and a top finish portion that extends between the first and second side walls. The top finish portion defines at least one of a shifter receiving aperture and a cup holder opening. A cross bracket is coupled to the first and second side walls and extends between the first and second side walls of the unitary main body.

18 Claims, 14 Drawing Sheets

CONSOLE ASSEMBLY FOR A VEHICLE

FIELD OF THE DISCLOSURE

The present disclosure generally relates to a console assembly for a vehicle. More specifically, the present disclosure generally relates to a console assembly for a vehicle that includes a unitary main body and a cross bracket coupled to the unitary main body.

BACKGROUND OF THE DISCLOSURE

Vehicle center consoles and other console boxes for vehicles often include a base structure that is coupled to the floor of the vehicle and configured to reinforce a plurality of trim pieces that are coupled to the base and each other to form a main body of the console. A console assembly that utilizes an integrally formed main body and a cross bracket that is configured to provide structural integrity to the unitary main body may be desired.

SUMMARY OF THE DISCLOSURE

According to a first aspect of the present disclosure, a console assembly for a vehicle includes a unitary main body. The unitary main body includes a first side wall, a second side wall, and an intermediate structure that extends between the first and second side walls. The intermediate structure includes a main receptacle portion that defines a main storage cavity between the first and second side walls, a media receptacle portion that defines a media storage cavity between the first and second side walls, and a top finish portion positioned between the main receptacle portion and the media receptacle portion. The top finish portion extends between the first and second side walls and defines at least one of a shifter receiving aperture and a cup holder opening. The console assembly also includes a door coupled to the unitary main body. In a closed position, the door covers an opening to the main storage cavity. In an open position, access to the main storage cavity is provided via the opening. The console assembly further includes a first side panel coupled to the first side wall, a second side panel coupled to the second side wall, and a cross bracket coupled to and extending between the first and second side walls.

Embodiments of the first aspect of the present disclosure may include any one or a combination of the following features:
- at least a portion of the cross bracket is positioned between the first side wall and the first side panel;
- the first side wall extends from the intermediate structure to a first side wall edge that separates an interior surface of the first side wall from an exterior surface of the first side wall, and the cross bracket is coupled to the first side wall, such that a portion of the cross bracket extends over a portion of the first side wall edge;
- the cross bracket includes a first attachment feature operably coupled to the first side wall, a second attachment feature operably coupled to the second side wall, and a support member extending between the first and second attachment features, wherein the first attachment feature is coupled to the first side wall, such that the first attachment feature contacts the exterior surface of the first side wall;
- the first attachment feature includes a tab extending outward from the support member to define a gap between the tab and the support member, wherein the first attachment feature is configured to be coupled to the first side wall, such that the first side wall edge is disposed within the gap between the tab and the support member, and the tab contacts the exterior surface of the first side wall;
- the tab defines a receiving aperture configured to receive a protrusion defined by the exterior surface of the first side wall;
- the first side panel is coupled to the exterior surface of the first side wall, such that the portion of the first attachment feature that contacts the exterior surface of the first side wall is concealed by the first side panel; and
- the cross bracket is suspended between the first and second side walls.

According to a second aspect of the present disclosure, a console assembly for a vehicle includes a unitary main body. The unitary main body includes a first side wall, a second side wall, and a top finish portion that extends between the first and second side walls and defines at least one of a shifter receiving aperture and a cup holder opening. The console assembly also includes a cross bracket coupled to and extending between the first and second side walls.

Embodiments of the second aspect of the present disclosure may include any one or a combination of the following features:
- the first side wall extends from the top finish portion to a first side wall edge that separates an interior surface of the first side wall from an exterior surface of the first side wall, and the cross bracket is coupled to the first side wall, such that a portion of the cross bracket extends over a portion of the first side wall edge;
- the first side wall extends from the top finish portion to a first side wall edge that separates an interior surface of the first side wall from an exterior surface of the first side wall;
- the cross bracket includes a first attachment feature operably coupled to the first side wall, a second attachment feature operably coupled to the second side wall, and a support member extending between the first and second attachment features, wherein the first attachment feature is coupled to the first side wall, such that the first attachment feature contacts the exterior surface of the first side wall;
- the first attachment feature includes a tab extending outward from the support member to define a gap between the tab and the support member, wherein the first attachment feature is configured to be coupled to the first side wall, such that the first side wall edge is disposed within the gap between the tab and the support member, and the tab contacts the exterior surface of the first side wall;
- the tab defines a receiving aperture configured to receive a protrusion defined by the exterior surface of the first side wall; and
- the cross bracket is suspended between the first and second side walls.

According to a third aspect of the present disclosure, a console assembly for a vehicle includes a unitary main body. The unitary main body includes a top finish portion, a first side wall extending from the top finish portion to a first side wall edge that separates an interior surface of the first side wall from an exterior surface of the first side wall, and a second side wall extending from the top finish portion to a second side wall edge that separates an interior surface of the second side wall from an exterior surface of the second side wall. The interior surfaces of the first and second side walls face toward each other, and the exterior surfaces of the first and second side walls face away from each other. The console assembly also includes a cross bracket coupled to the first and second side walls and extending there-between. The cross bracket extends over a portion of the first side wall edge.

Embodiments of the third aspect of the present disclosure may include any one or a combination of the following features:

- the cross bracket includes a first attachment feature operably coupled to the first side wall, a second attachment feature operably coupled to the second side wall, and a support member extending between the first and second attachment features, wherein the first attachment feature is coupled to the first side wall, such that the first attachment feature contacts the exterior surface of the first side wall, and the second attachment feature is coupled to the second side wall, such that the second attachment feature contacts the exterior surface of the second side wall;
- the first attachment feature includes a tab extending outward from the support member to define a gap between the tab and the support member, wherein the first attachment feature is configured to be coupled to the first side wall, such that the first side wall edge is disposed within the gap between the tab and the support member, and the tab contacts the exterior surface of the first side wall;
- the tab defines a receiving aperture configured to receive a protrusion defined by the exterior surface of the first side wall;
- the support member is positioned between the interior surfaces of the first and second side walls, respectively; and
- the cross bracket is suspended between the first and second side walls.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
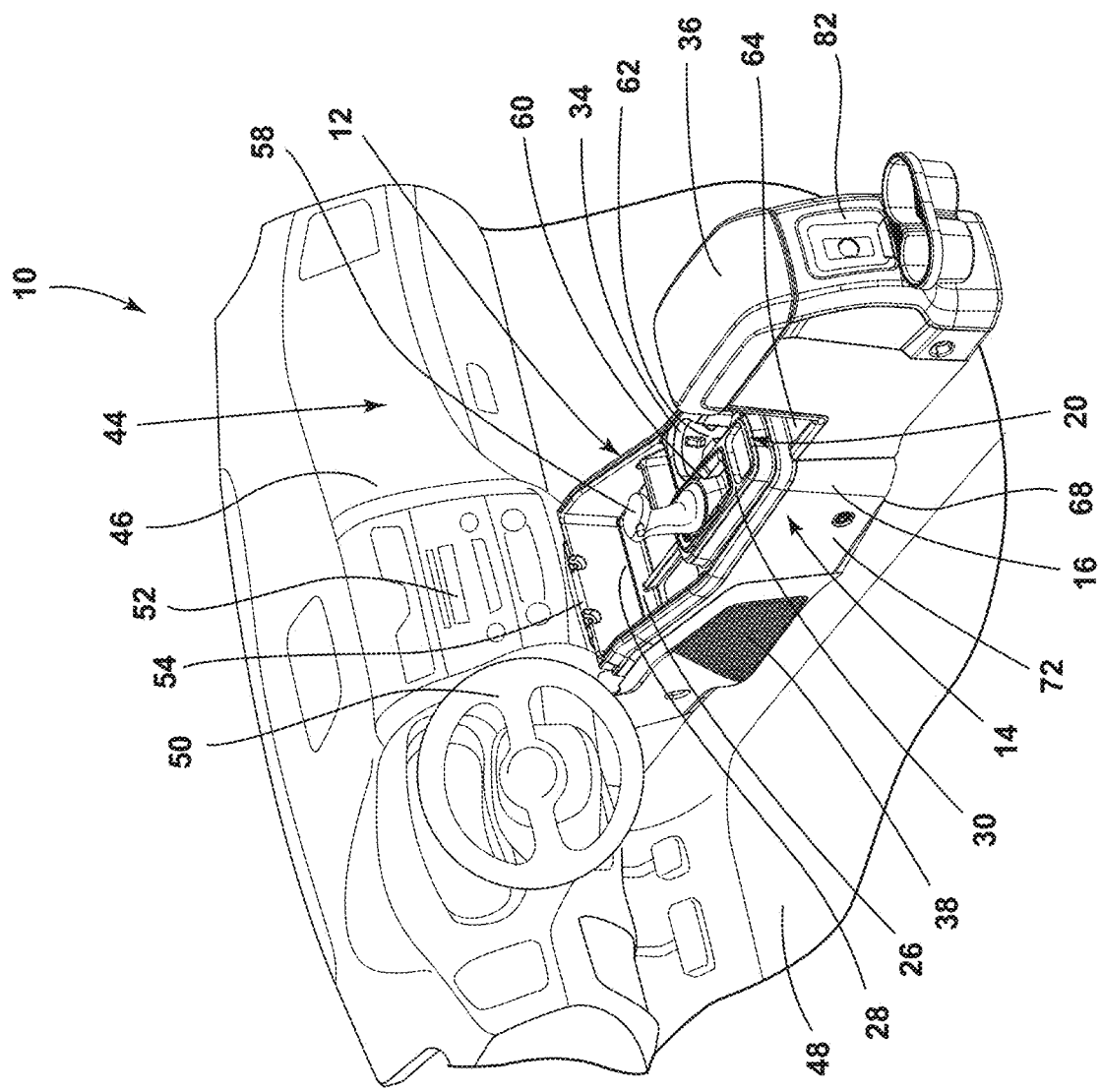
FIG. 1 is a perspective view of a vehicle interior of a vehicle, illustrating a console assembly positioned proximate to a dashboard of the vehicle, according to one embodiment.

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In reference to FIGS. 1-15, a vehicle 10 includes a console assembly 12. The console assembly 12 includes a unitary main body 14. The unitary main body 14 may include a first side wall 16, a second side wall 18, and an intermediate structure 20 that extends between the first and second side walls 16, 18. The intermediate structure 20 may include a main receptacle portion 22 that defines a main storage cavity 24 between the first and second side walls 16, 18, a media receptacle portion 26 that defines a media storage cavity 28 between the first and second side walls 16, 18, and a top finish portion 30 that is positioned between the main receptacle portion 22 and the media receptacle portion 26. The top finish portion 30 may extend between the first and second side walls 16, 18 and may define at least one of a shifter receiving aperture 32 and a cup holder opening 34. A door 36 is coupled to the unitary main body 14 and is operable between a closed position, wherein the door 36 covers an opening to the main storage cavity 24, and an open position, wherein access to the main storage cavity 24 is provided via the opening. The console assembly 12 may further include a first side panel 38 that is coupled to the first side wall 16, a second side panel 40 that is coupled to the second side wall 18, and a cross bracket 42 that is coupled to the first and second side walls 16, 18 and that extends between the first and second side walls 16, 18.

Referring now to FIG. 1, the vehicle 10 includes a vehicle interior 44 having a floor 48. A dashboard 46 may be positioned vehicle-upward from the floor 48 and/or may extend upward from the floor 48 at a vehicle-forward end of the vehicle interior 44. The dashboard 46 may be proximate to a windshield of the vehicle 10. As illustrated in FIG. 1, a steering wheel 50 may be positioned on the dashboard 46, and the dashboard 46 may include an instrument panel 52 having a human-machine interface (e.g., touchscreen, media player, control buttons, etc.). The console assembly 12 may be positioned within the vehicle interior 44. The console assembly 12 may be positioned at the vehicle-forward end of the vehicle interior 44 and/or may be coupled to the dashboard 46 of the vehicle 10, as illustrated in FIG. 1. In some embodiments, the console assembly 12 may be a center console of the vehicle 10. In various embodiments, the console assembly 12 may be coupled to the floor 48 of the vehicle 10, as illustrated in FIG. 1.

Figure 3:
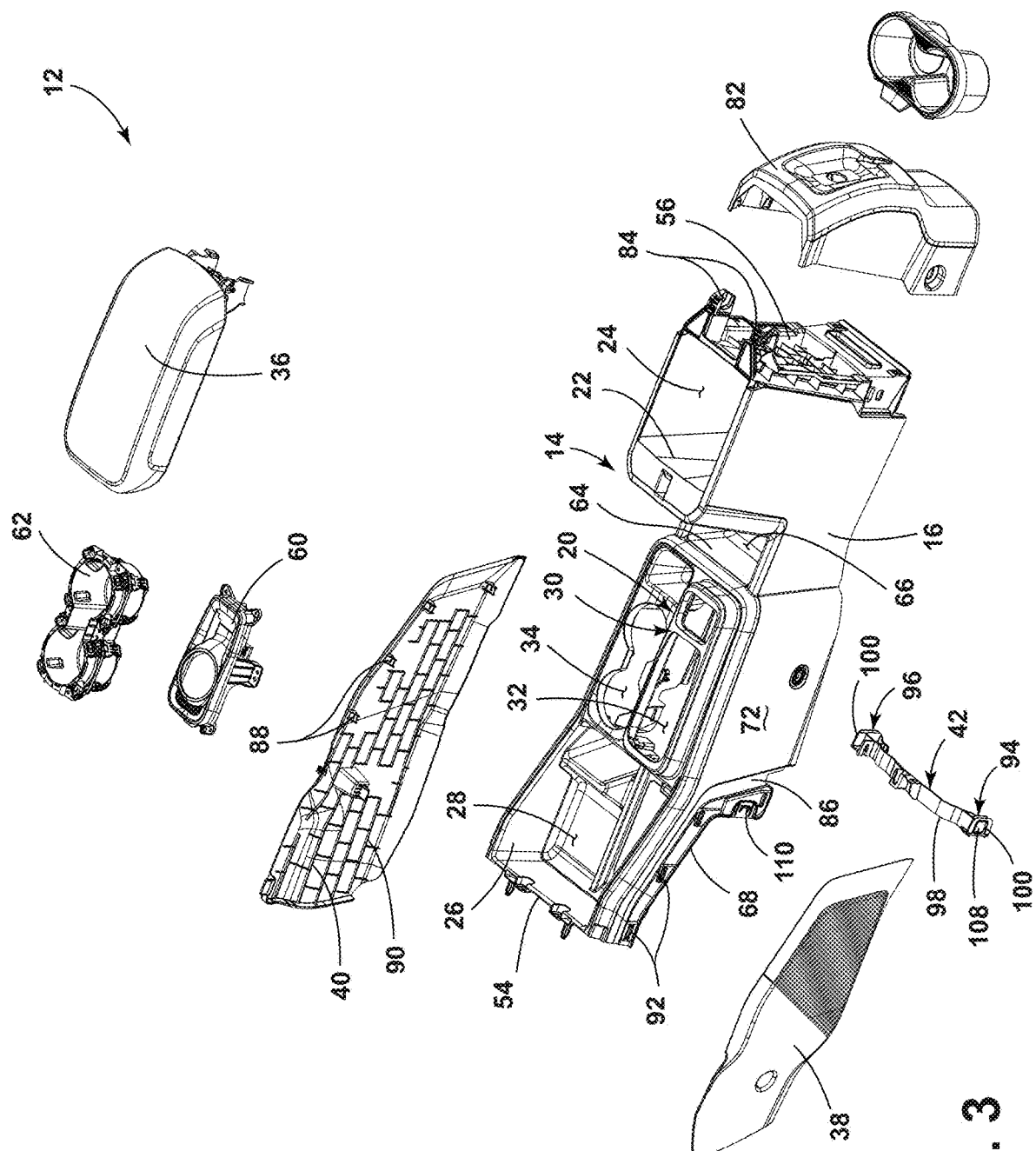
FIG. 3 is an exploded view of the console assembly, according to one embodiment.
Figure 4:
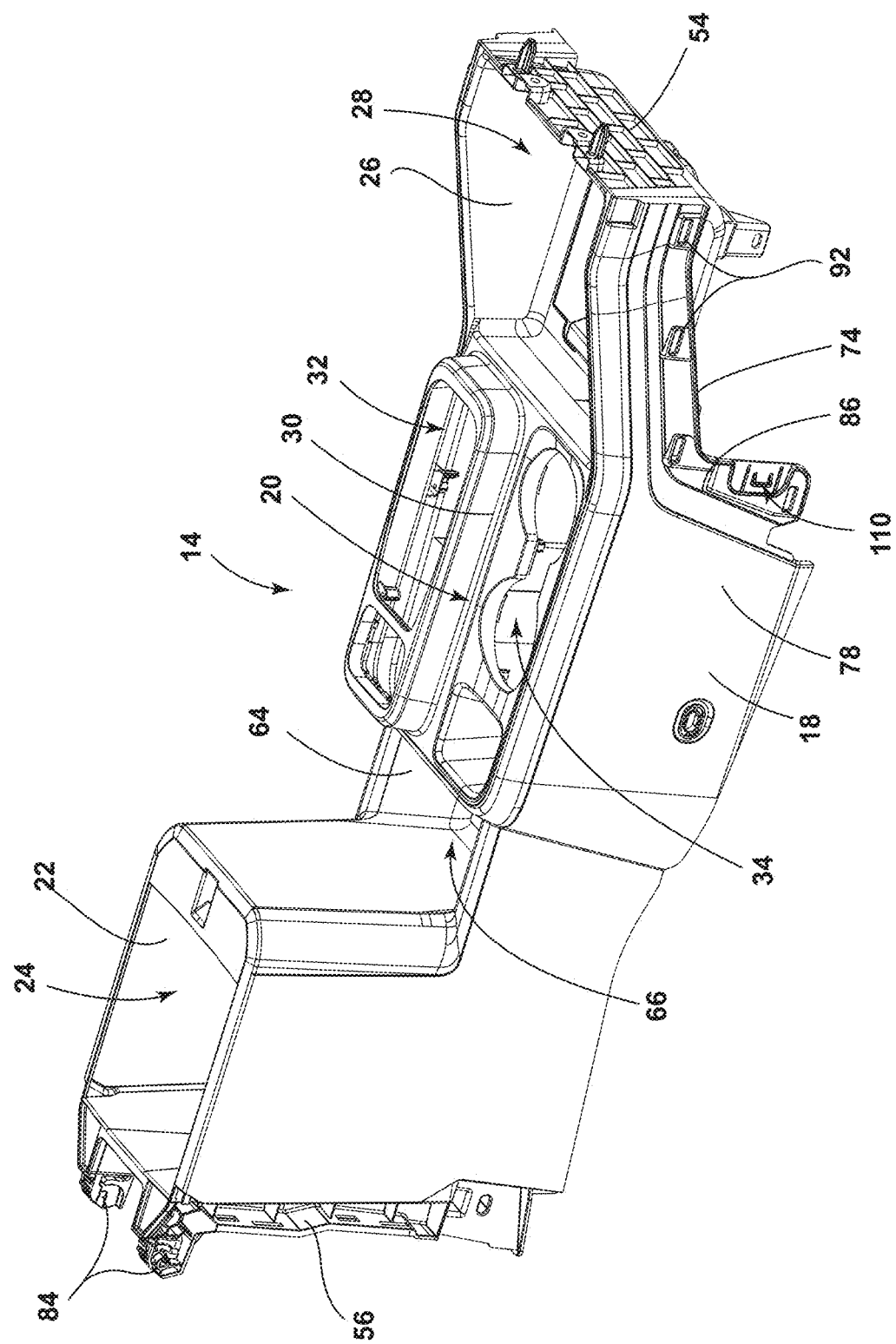
FIG. 4 is a perspective view of a unitary main body of the console assembly, according to one embodiment.
Figure 5:
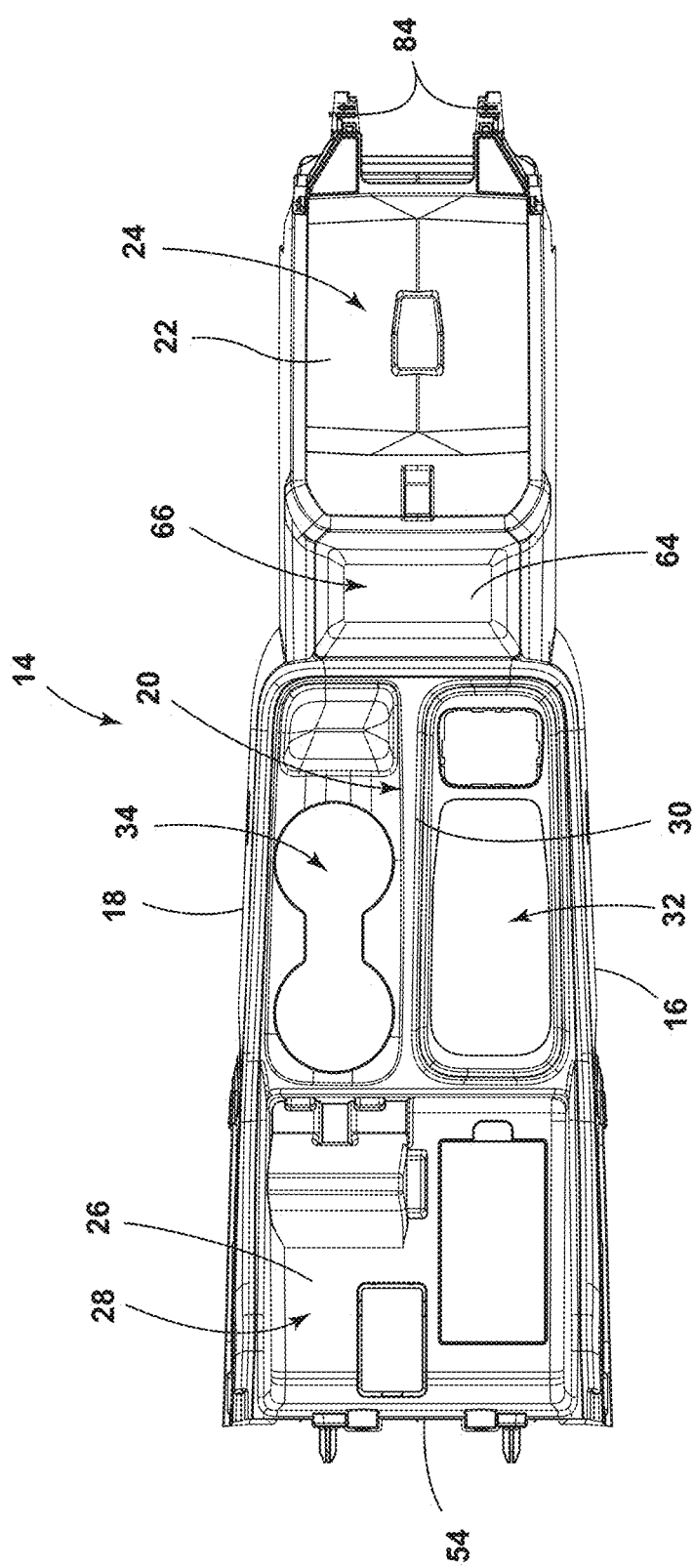
FIG. 5 is a plan view of the unitary main body of the console assembly, according to one embodiment.
Figure 6:
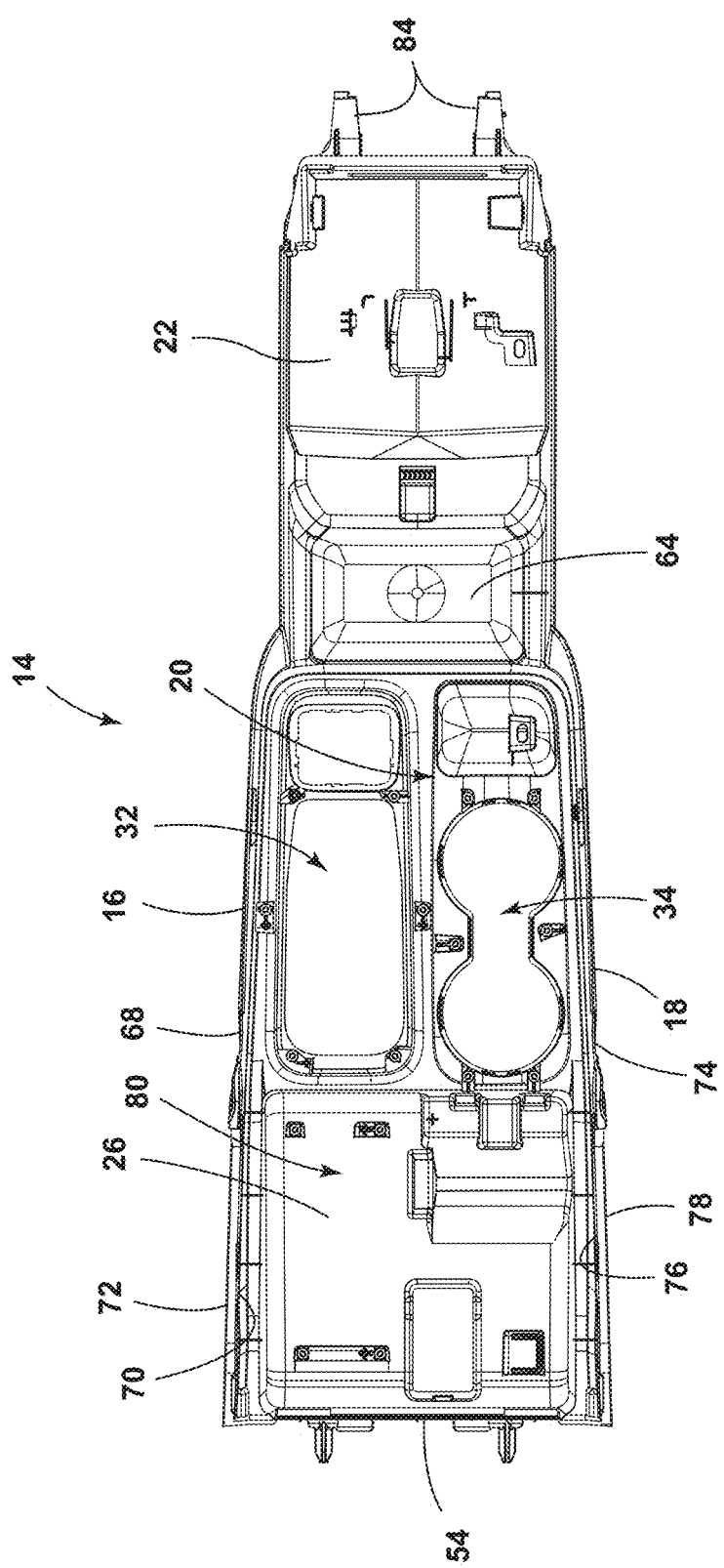
FIG. 6 is a bottom view of the unitary main body of the console assembly, according to one embodiment.

Referring now to FIGS. 1-7, the console assembly 12 may include a main body 14. In various embodiments, and as illustrated in FIGS. 1-7, the main body 14 may be the unitary main body 14. In other words, the main body 14 may be a single unitary structure that is integrally formed (i.e., a one-piece component). In various embodiments, the unitary main body 14 includes the first side wall 16, the second side wall 18, and the intermediate structure 20. As illustrated in FIGS. 5 and 6, the intermediate structure 20 extends between the first and second side walls 16, 18. In various embodiments, the intermediate structure 20 includes a forward end 54 and a rearward end 56 that is opposite the forward end 54. The forward end 54 may be positioned proximate to the vehicle-forward end of the vehicle interior 44 and may face vehicle-forward. For example, as illustrated in FIG. 1, the forward end 54 faces vehicle-forward away from the viewer and is coupled to the dashboard 46 of the vehicle 10. The rearward end 56 of the intermediate structure 20 is positioned distally from the forward end 54 of the intermediate structure 20 and may face generally vehicle-rearward. In some embodiments, the rearward end 56 of the intermediate structure 20 may be the vehicle-rearward-most portion of the unitary main body 14. In some embodiments, the rearward end 56 of the intermediate structure 20 may be configured to receive and/or be coupled to other components of the console assembly 12, such as an endcap 82 and/or the door 36, as described further herein.

Figure 2:
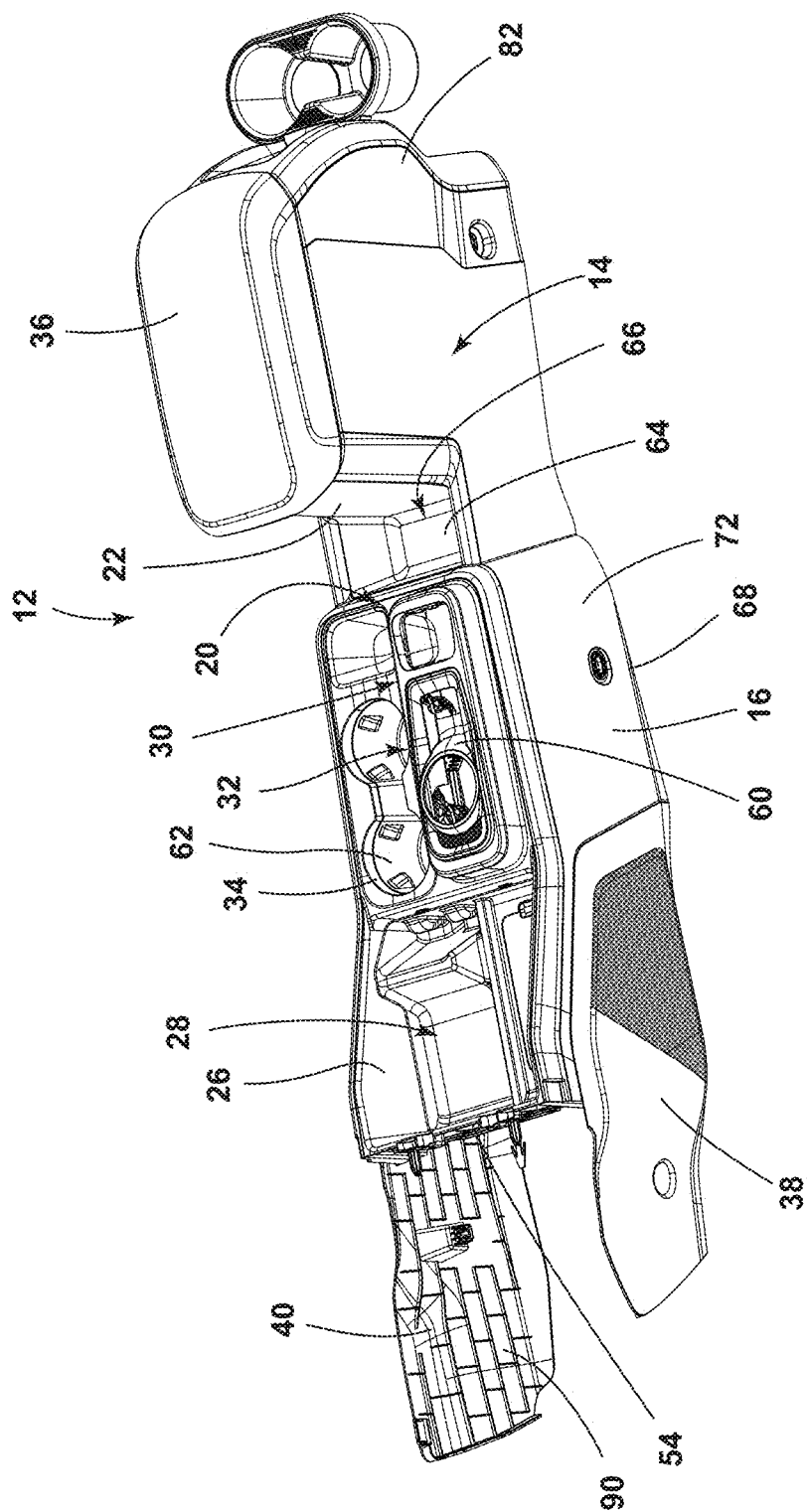
FIG. 2 is an upper perspective view of the console assembly, according to one embodiment.

Referring still to FIGS. 1-7, in some embodiments, the intermediate structure 20 of the unitary main body 14 may include the main receptacle portion 22. The main receptacle portion 22 may define the main storage cavity 24 between the first and second side walls 16, 18 of the unitary main body 14. The main storage cavity 24 may be defined by the main receptacle portion 22 of the intermediate structure 20 together with the first and/or second side walls 16, 18. For example, as discussed further herein, the first and second side walls 16, 18 may include interior surfaces 70, 76, and the interior surfaces 70, 76 may define the main storage cavity 24 together with the main receptacle portion 22 of the intermediate structure 20 of the unitary main body 14. As illustrated in FIGS. 1-3, the main receptacle portion 22 of the intermediate structure 20 may be positioned proximate to the rearward end 56 of the intermediate structure 20. The main receptacle portion 22 may extend vehicle-upward further than any other portion of the intermediate structure 20 of the unitary main body 14, in some embodiments.

In further reference to FIGS. 1-7, the intermediate structure 20 of the unitary main body 14 may include the media receptacle portion 26. The media receptacle portion 26 may define the media storage cavity 28 between the first and second side walls 16, 18 of the unitary main body 14. As illustrated in FIGS. 1-3, the media receptacle portion 26 may be positioned proximate to the forward end 54 of the intermediate structure 20. The media receptacle portion 26 may be in a spaced relationship with the main receptacle portion 22 of the intermediate structure 20. In various implementations, the media receptacle portion 26 may be spaced apart from the main receptacle portion 22 of the intermediate structure 20 in a vehicle-forward direction. The media storage cavity 28 may be an open-topped receptacle that is shallower than the main storage cavity 24 defined by the main receptacle portion 22 of the intermediate structure 20. In some implementations, the media receptacle portion 26 of the intermediate structure 20 of the unitary main body 14 may be configured to receive and/or be coupled with hardware configured for charging an electronic device. For example, an inductive charger configured to wirelessly charge a mobile phone placed in close proximity with the inductive charger may be coupled to an underside of the media receptacle portion 26 of the intermediate structure 20, in some embodiments.

In various embodiments, the intermediate structure 20 includes a top finish portion 30, which extends between the first and second side walls 16, 18 of the unitary main body 14. The top finish portion 30 may be positioned nearer than the main receptacle portion 22 of the intermediate structure 20 to the forward end 54 of the intermediate structure 20, as illustrated in FIG. 3. In some embodiments, the top finish portion 30 may be nearer than the media receptacle portion 26 to the rearward end 56 of the intermediate structure 20. As illustrated in FIG. 4, the top finish portion 30 is positioned between the media receptacle portion 26 and the main receptacle portion 22 of the intermediate structure 20. The top finish portion 30 extends between and is integrally coupled to the first side wall 16 and the second side wall 18.

In some embodiments, the top finish portion 30 may define a shifter receiving aperture 32. The shifter receiving aperture 32 may be configured to receive a shifter 58 of the vehicle 10 there through. As illustrated in FIGS. 1 and 3, a shifter bezel 60 is configured to be received within the shifter receiving aperture 32, and the shifter bezel 60 defines an opening for receiving the shifter 58. As such, in the exemplary embodiment illustrated in FIGS. 1 and 3, the shifter receiving aperture 32 receives the shifter 58 through the opening in the shifter bezel 60, as illustrated in FIG. 1. In the embodiment illustrated in FIG. 1, the shifter 58 received through the shifter receiving aperture 32 is a manual, lever-style shifter. Various other types of shifters 58 are contemplated. For example, the shifter 58 may be an electric shifter that includes a knob configured to be rotated to prompt shifting electronically. In such embodiments, the shifter 58 may extend through the shifter receiving aperture 32 via hardware extending from the knob through the shifter receiving aperture 32.

In some embodiments, the top finish portion 30 of the intermediate structure 20 of the unitary main body 14 may define a cup holder opening 34. In some embodiments, the cup holder opening 34 be the opening to a cup holder that is integrally formed with the unitary main body 14 and that defines cup holder cavities for receiving beverage containers therein. In some embodiments, the cup holder opening 34 may be one or more apertures that extend through the top finish portion 30, and a cup holder insert 62 may be configured to be coupled to the top finish portion 30 to hold the beverage containers received within the one or more apertures. For example, as illustrated in FIGS. 1 and 3, the top finish portion 30 defines a cup holder opening 34 that extends through the top finish portion 30, and the cup holder insert 62 positioned below the cup holder opening 34 is configured to hold a beverage container received within the cup holder opening 34. As illustrated in FIGS. 4-6, the top finish portion 30 of the intermediate structure 20 includes both the cup holder opening 34 and the shifter receiving aperture 32. In the illustrated embodiment, the cup holder opening 34 is separated from the shifter receiving aperture 32 by a portion of the top finish portion 30.

In further reference to FIGS. 1-7, the intermediate structure 20 of the unitary main body 14 may include a secondary receptacle portion 64. The secondary receptacle portion 64 may be positioned between the top finish portion 30 and the main receptacle portion 22 of the intermediate structure 20. In the embodiment illustrated in FIG. 2, the secondary receptacle portion 64 is an open-topped receptacle that defines a secondary cavity 66. It is contemplated that, in various embodiments, the intermediate structure 20 of the unitary main body 14 may include additional portions and/or may omit one or more of the above-described portions of the intermediate structure 20. For example, in some embodiments, the unitary main body 14 may include the main receptacle portion 22, the secondary receptacle portion 64, and the top finish portion 30 and omit the media receptacle portion 26. Further, in some examples, the intermediate structure 20 of the unitary main body 14 may include the main receptacle portion 22, the media receptacle portion 26, and the top finish portion 30 and omit the secondary receptacle portion 64.

Figure 7:
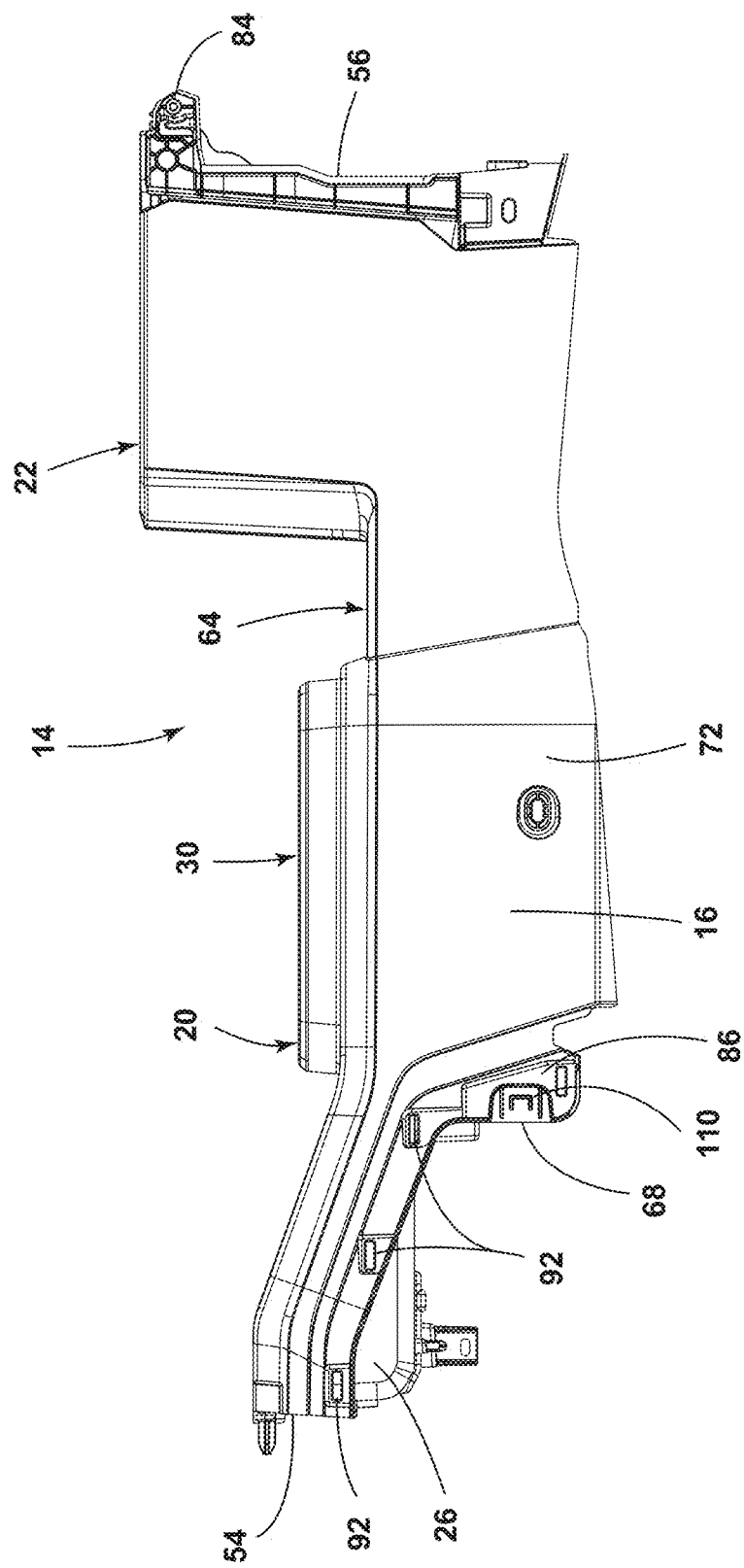
FIG. 7 is a side elevational view of the unitary main body of the console assembly, according to one embodiment.
Figure 15:
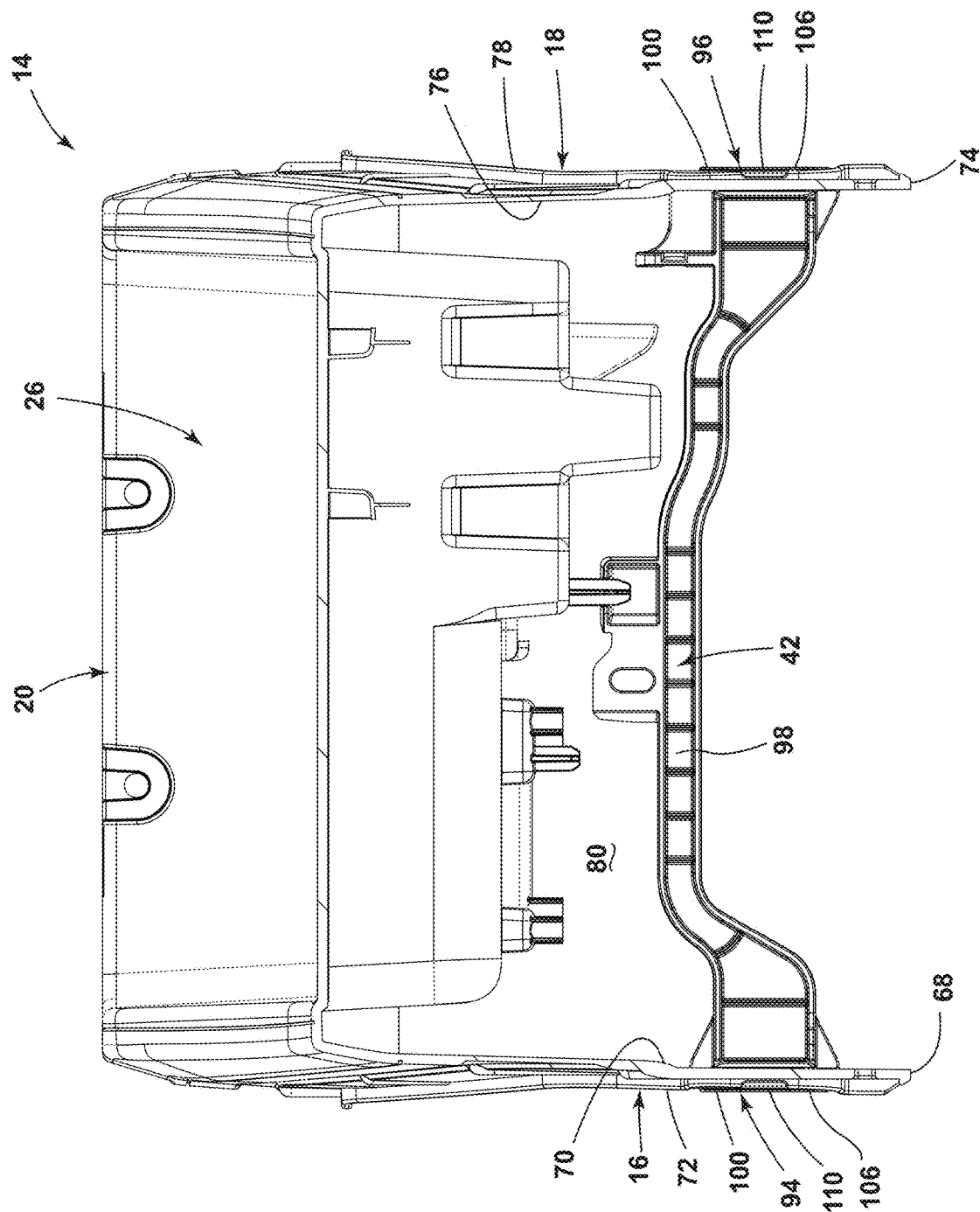
FIG. 15 is a cross-sectional view taken at line XV-XV of FIG. 14, illustrating the cross bracket extending between the first and second side walls of the unitary main body, according to one embodiment.

As illustrated in FIGS. 1-7 and 15, the unitary main body 14 of the console assembly 12 includes the first side wall 16 and the second side wall 18. As illustrated in FIGS. 5, 6, and 15, the intermediate structure 20 extends between the first and second side walls 16, 18. As illustrated in FIG. 7, the first side wall 16 extends from the intermediate structure 20 to a first side wall edge 68. In various embodiments, the first side wall 16 extends vehicle-downward from the intermediate structure 20 to the first side wall edge 68. Some embodiments, the first side wall 16 may extend from the main receptacle portion 22, the secondary receptacle portion 64, the top finish portion 30, and/or the media receptacle portion 26 of the intermediate structure 20 to the first side wall edge 68. The first side wall edge 68 may separate the interior surface 70 of the first side wall 16 from an exterior surface 72 of the first side wall 16, as illustrated in FIG. 15. The interior surface 70 of the first side wall 16 made be positioned opposite the exterior surface 72 of the first side wall 16.

As illustrated in FIG. 4, the second side wall 18 may extend from the intermediate structure 20 to a second side wall edge 74. The second side wall 18 may extend vehicle-downward from the intermediate structure 20 to the second side wall edge 74. In some embodiments, the second side wall 18 may extend from the main receptacle portion 22, the secondary receptacle portion 64, the top finish portion 30, and/or the media receptacle portion 26 of the intermediate structure 20 to the second side wall edge 74. The second side wall edge 74 may separate the interior surface 76 of the second side wall 18 from an exterior surface 78 of the second side wall 18. The interior surface 76 of the second side wall 18 may be positioned opposite of the exterior surface 78 of the second side wall 18, as illustrated in FIG. 15.

As illustrated in FIG. 15, in various embodiments, the interior surfaces 70, 76 of the first and second side walls 16, 18 may face toward each other. The exterior surfaces 72, 78 of the first and second side walls 16, 18 may face away from each other. In various embodiments, portions of the exterior surfaces 72, 78 of the first and second side walls 16, 18 may form a portion of the outer surface of the console assembly 12 that is configured to be visible to an occupant of the vehicle 10, as illustrated in FIG. 1. The interior surfaces 70, 76 of the first and second side walls 16, 18 may be concealed from the view of the occupant within the vehicle 10 and may form a hollow 80 beneath the console assembly 12 together with the underside of the intermediate structure 20, which extends between the interior surfaces 70, 76 of the first and second side walls 16, 18. In some embodiments, the first and second side walls 16, 18 may be adjacent to and/or coupled to the floor 48 of the vehicle 10. For example, portions of the first and second side wall edges 68, 74 may be adjacent to and/or coupled to the floor 48.

Referring now to FIGS. 1-3, in various embodiments, a variety of console assembly 12 components may be coupled to the unitary main body 14 of the console assembly 12 in an assembled condition of the console assembly 12. As described above, the cup holder insert 62 and/or the shifter bezel 60 may be coupled to the top finish portion 30 of the intermediate structure 20 of the unitary main body 14, in some implementations. As illustrated in FIGS. 1-3, the endcap 82 may be coupled to the unitary main body 14. In the embodiments illustrated in FIGS. 1-3, the endcap 82 is configured to be coupled to the rearward end 56 of the intermediate structure 20, such that the endcap 82 is generally flush with the exterior surfaces 72, 78 of the portions of the first and second side walls 16, 18 that are adjacent to the endcap 82. Further, in the depicted embodiment, a cup holder feature is coupled to the endcap 82.

In further reference to FIGS. 1-3, the door 36 may be coupled to the unitary main body 14 and may be operable between the closed position, wherein the door 36 covers an opening to the main storage cavity 24, and the open position, wherein access to the main storage cavity 24 is provided via the opening. In some embodiments, the door 36 may be pivotably coupled to the main body 14, such that the door 36 pivots between the open and closed positions. As illustrated in FIG. 3, the door 36 is configured to be pivotably coupled to mounting portions 84 of the rearward end 56 of the intermediate structure 20 of the unitary main body 14 that protrude outward away from the main receptacle portion 22 of the intermediate structure 20. A variety of types of doors 36 configured to cover and provide access to an opening of the main storage cavity 24 are contemplated.

As further illustrated in FIGS. 1-3, the console assembly 12 may include the first side panel 38 and the second side panel 40. The first side panel 38 may be coupled to the first side wall 16. The second side panel 40 may be coupled to the second side wall 18. In various embodiments, the first side panel 38 may be configured to be coupled to the exterior surface 72 of the first side wall 16 of the unitary main body 14. Likewise, in some embodiments, the second side panel 40 may be configured to be coupled to the exterior surface 78 of the second side wall 18 of the unitary main body 14. First and/or second side panels 38, 40 may be configured to overlap with portions 86 of the exterior surfaces 72, 78 of the first and second side walls 16, 18, respectively. The overlapped portions 86 of the exterior surfaces 72, 78 of the first and/or second side walls 16, 18 may be recessed relative to the non-overlapped portions of the first and/or second side walls 16, 18 that are adjacent to the overlapped portions 86. The overlapped portions 86 being recessed may allow the first and/or second side panels 38, 40 to nest when coupled to the unitary main body 14, such that an external side of the first and/or second side panel 38, 40 may be generally flush with the non-overlapped portions of the first and/or second side walls 16, 18 adjacent to the first and/or second side panels 38, 40.

In the embodiment illustrated in FIG. 3, the first and second side panels 38, 40 include clips 88 that protrude outward from internal sides 90 of the first and second side panels 38, 40. The clips 88 are configured to matingly engage receiving slots 92 defined by the overlapped portions 86 of the first and second side walls 16, 18, respectively, to couple the first and second side panels 38, 40 to the first and second side walls 16, 18, respectively, as illustrated in FIG. 2. In various embodiments, the first and second side panels 38, 40 may be coupled to the unitary main body 14 proximate to the forward end 54 of the unitary main body 14 and may extend vehicle-forward beyond the forward end 54 of the intermediate structure 20 of the unitary main body 14. A variety of types of side panels 38, 40 are contemplated. Further, it is contemplated that the first and second side panels 38, 40 may be coupled to the unitary main body 14 in a variety of ways. Further, in some embodiments, the console assembly 12 may omit the first and second side panels 38, 40 entirely.

Figure 11:
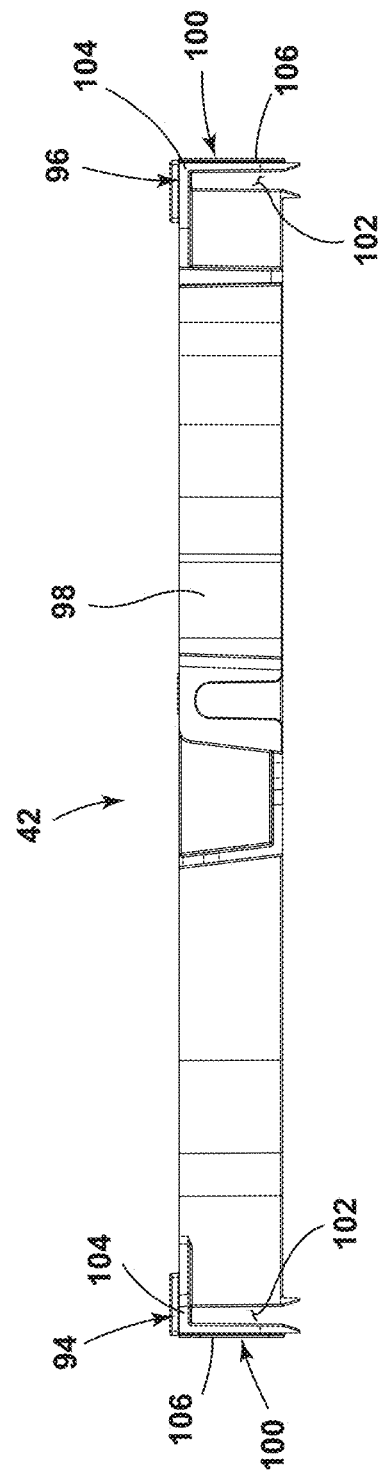
FIG. 11 is a plan view of the cross bracket, according to one embodiment.
Figure 12:
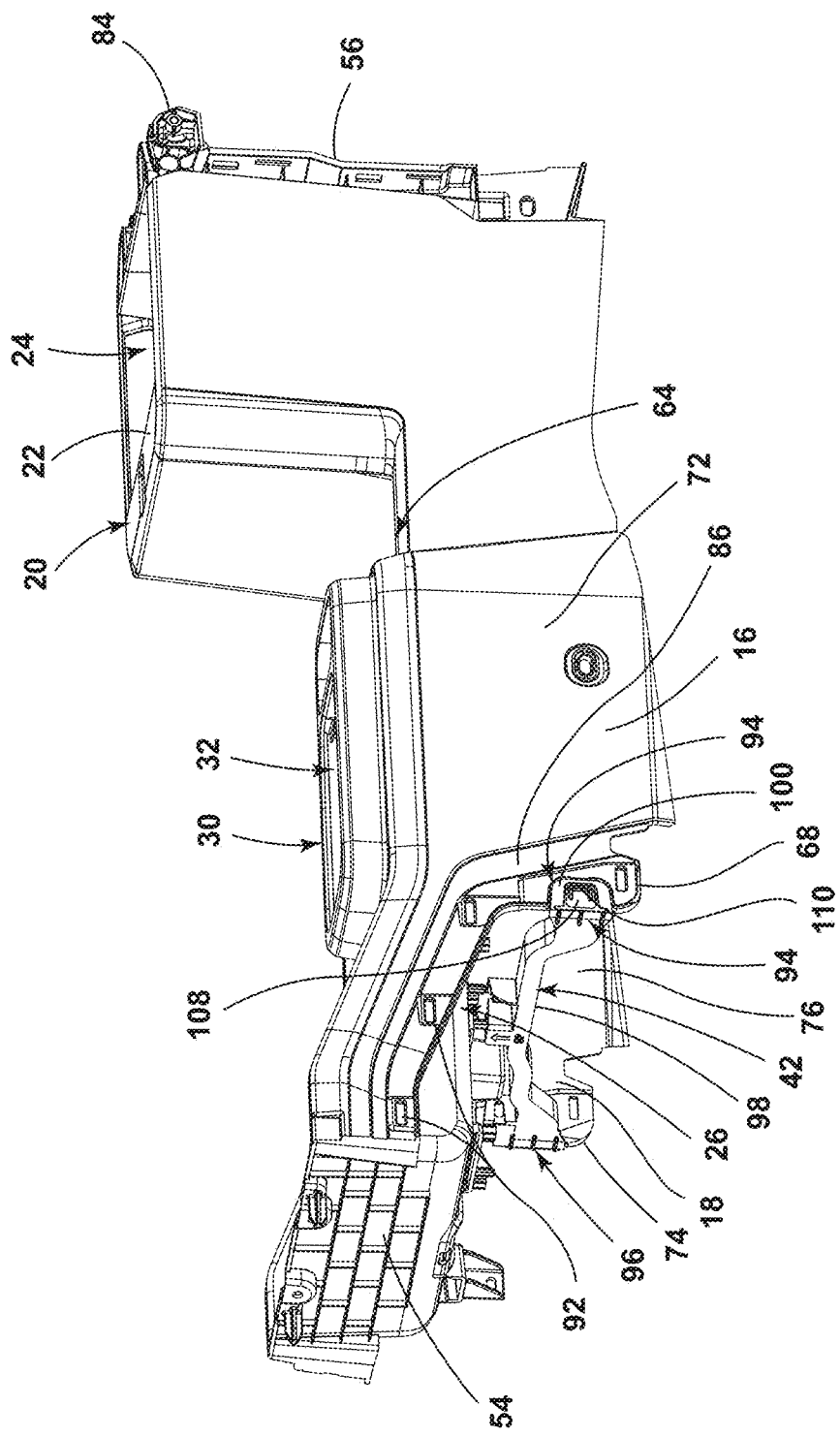
FIG. 12 is a perspective view of the unitary main body and the cross bracket extending between first and second side walls of the unitary main body, according to one embodiment.
Figure 13:
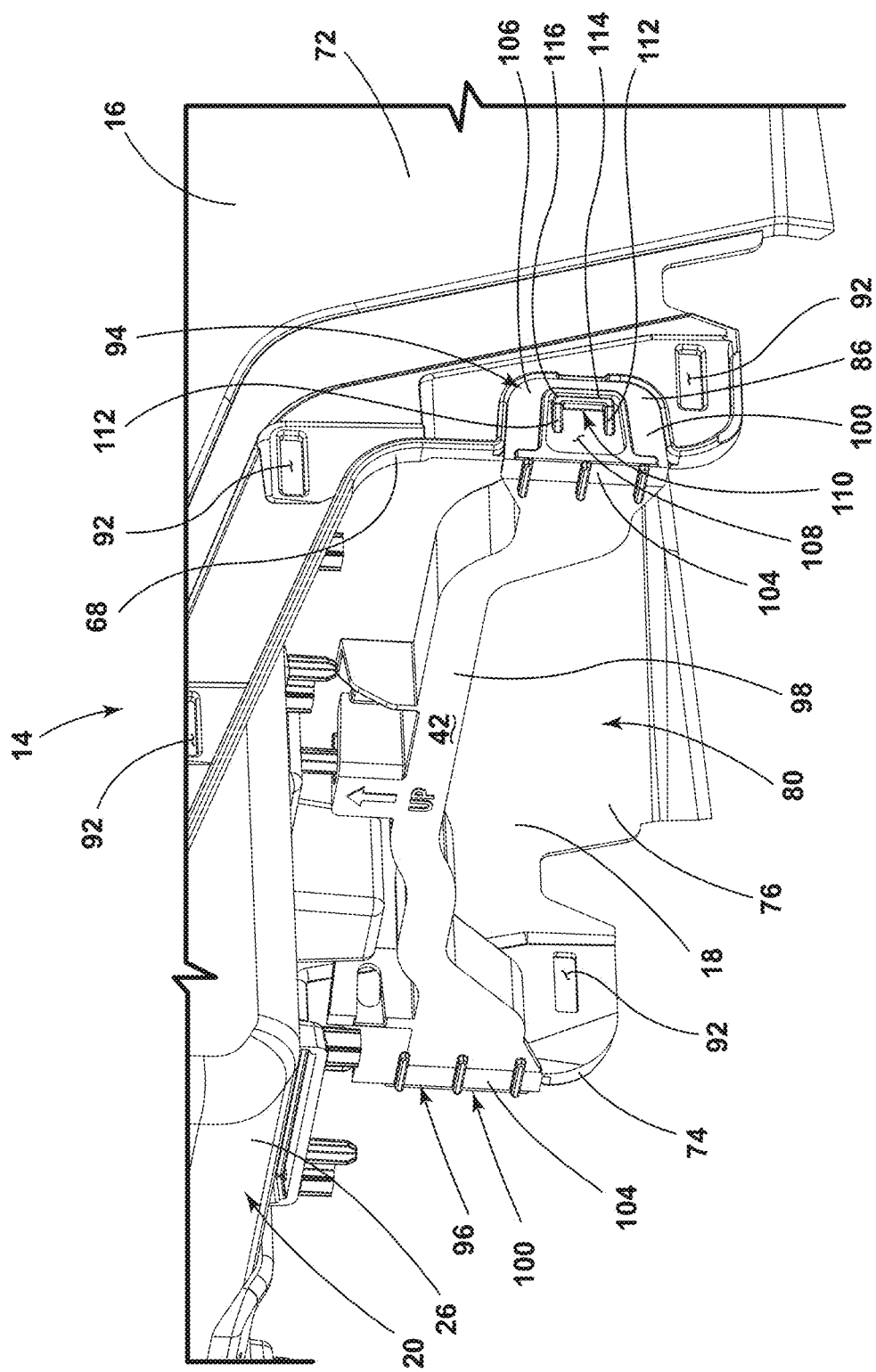
FIG. 13 is an enlarged perspective view of the cross bracket and a portion of the unitary main body illustrated in FIG. 12, illustrating the cross bracket coupled to the first and second side walls of the unitary main body of the console assembly, according to one embodiment.
Figure 14:
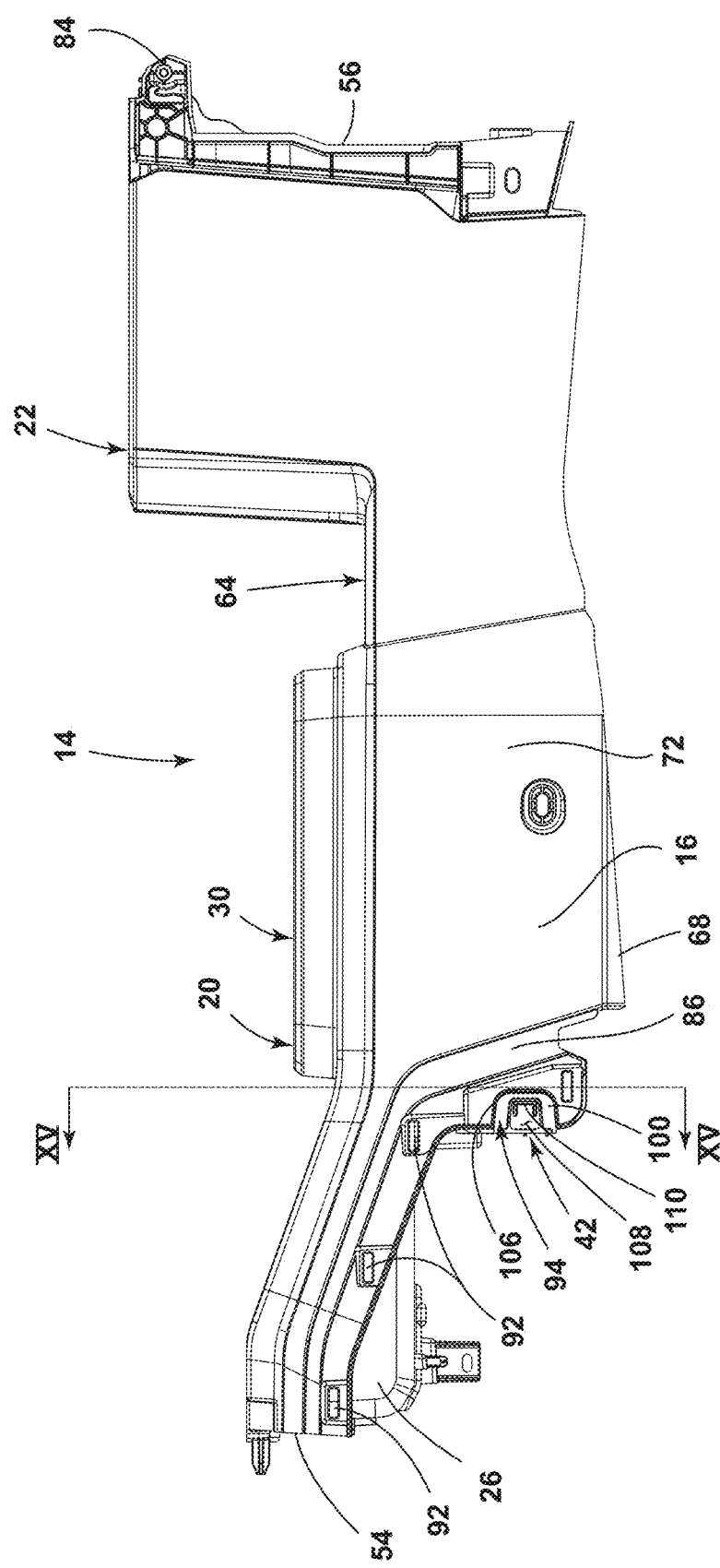
FIG. 14 is a side elevational view of the unitary main body and the cross bracket, illustrating an attachment feature of the cross bracket coupled to the exterior surface of the first side wall of the unitary main body, according to one embodiment.

Referring now to FIGS. 3 and 9-15, the console assembly 12 includes the cross bracket 42. The cross bracket 42 is configured to be coupled to the first and second side walls 16, 18 and extend there-between. In some embodiments, the cross bracket 42 may be suspended between the first and second side walls 16, 18. In other words, the cross bracket 42 may be supported by the first and second side walls 16, 18 to which the cross bracket 42 is coupled, as illustrated in FIGS. 12, 13, and 15, rather than being supported by the floor 48 of the vehicle 10 and/or another component between the floor 48 and the cross bracket 42. In some embodiments, the cross bracket 42 may be coupled to the first side wall 16 and/or may be coupled to the second side wall 18, such that a portion of the cross bracket 42 extends over a portion of the first side wall edge 68 and/or a portion of the cross bracket 42 extends over the second side wall edge 74. In some embodiments, at least a portion of the cross bracket 42 is positioned between the first side wall 16 and the first side panel 38. In some embodiments, at least a portion of the cross bracket 42 may be positioned between the second side wall 18 and the second side panel 40. The cross bracket 42 may be configured to provide structural integrity to the unitary main body 14 and the console assembly 12 more broadly, in various embodiments.

Referring still to FIGS. 3 and 9-15, in various embodiments, the cross bracket 42 may include a first attachment feature 94, a second attachment feature 96, and a support member 98 that extends between the first and second attachment features 94, 96. The first attachment feature 94 may be configured to be coupled to the first side wall 16 of the unitary main body 14. The second attachment feature 96 may be configured to be coupled to the second side wall 18 of the unitary main body 14. In some embodiments, the first attachment feature 94 may be configured to be coupled to the first side wall 16, such that a portion of the first attachment feature 94 contacts the exterior surface 72 of the first side wall 16. Likewise, in some embodiments, the second attachment feature 96 may be configured to be coupled to the second side wall 18, such that the second attachment feature 96 contacts the exterior surface 78 of the second side wall 18. In some embodiments, the first attachment feature 94 contacts the overlapped portion 86 of the exterior surface 72 of the first side wall 16 that the first side panel 38 is configured to overlap when coupled to the first side wall 16. Likewise, in some embodiments, the second attachment feature 96 of the cross bracket 42 may be configured to contact the overlapped portion 86 of the exterior surface 78 of the second side wall 18 that the second side panel 40 is configured to overlap when coupled to the second side wall 18. In various embodiments, the cross bracket 42 may be coupled to the first and/or the second side walls 16, 18, such that the first attachment feature 94 of the cross bracket 42 extends over the first side wall edge 68 and/or the second attachment feature 96 extends over the second side wall edge 74.

Figure 9:
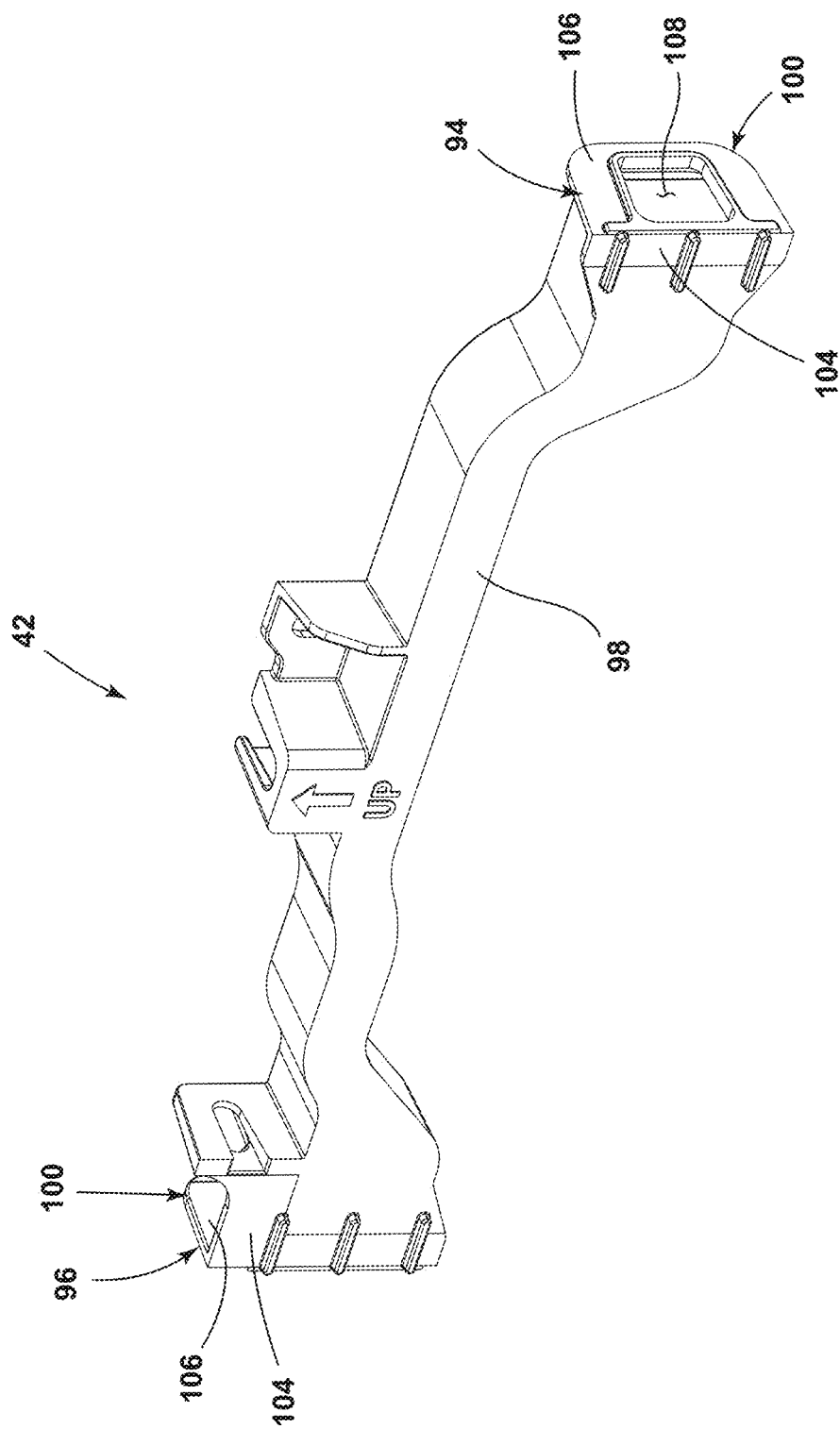
FIG. 9 is an upper perspective view of a cross bracket of the console assembly, according to one embodiment.
Figure 10:
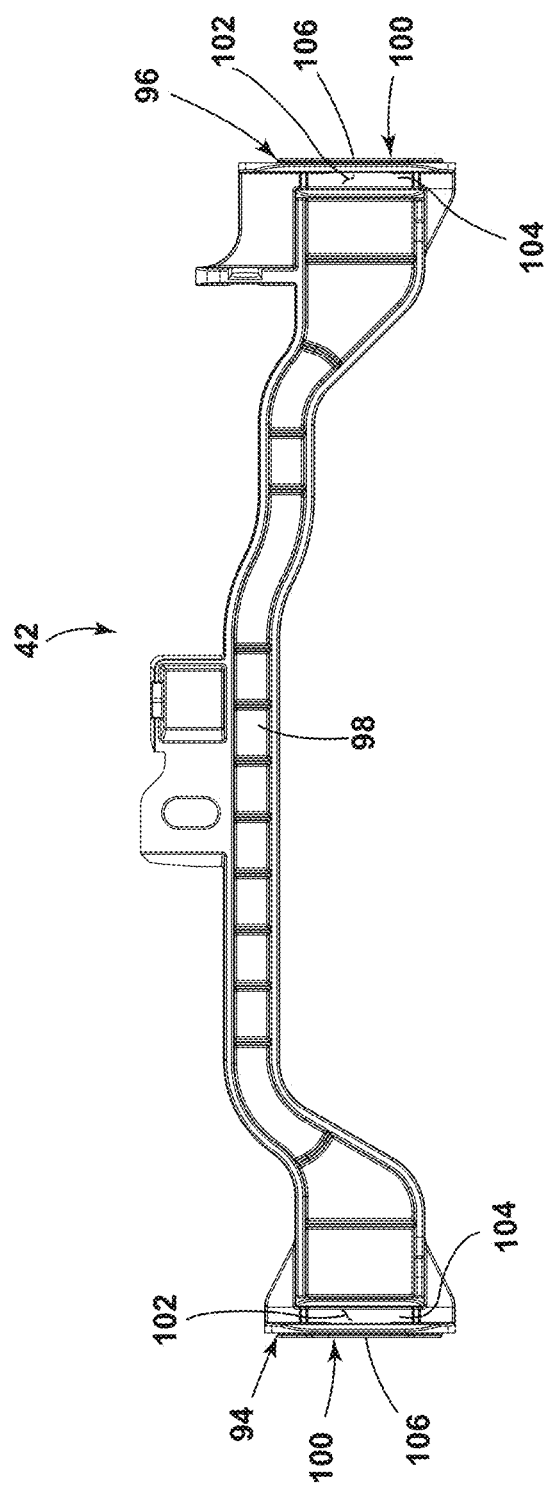
FIG. 10 is a rear elevational view of the cross bracket, according to one embodiment.

In the embodiment of the cross bracket 42 illustrated in FIGS. 9-15, the first and second attachment features 94, 96 include a tab 100. The tab 100 extends outward from the support member 98 to define a gap 102 between the tab 100 and support member 98, as illustrated in FIG. 11. As shown in FIG. 11, the tab 100 may be generally L-shaped, having a first portion 104 and a second portion 106. The first portion 104 of the tab 100 extends outward from the support member 98 to the second portion 106 and the second portion 106 extends outward from the first portion 104 in a direction generally perpendicular to the direction of extension of the first portion 104. In some embodiments, the tab 100 may define a receiving aperture 108. As illustrated in FIG. 9, the receiving aperture 108 may be defined by the second portion 106 of the tab 100.

Referring now to FIGS. 12-15, in various embodiments, the tab 100 of the first attachment feature 94 may be configured to extend over the first side wall edge 68 and/or the tab 100 of the second attachment feature 96 may be configured to extend over the second side wall edge 74 when the cross bracket 42 is coupled to the unitary main body 14. For example, as illustrated in FIG. 13, the first portion 104 of the tab 100 interfaces with and/or contacts the first side wall edge 68, and the second portion 106 of the tab 100 contacts the exterior surface 72 of the first side wall 16.

Figure 8:
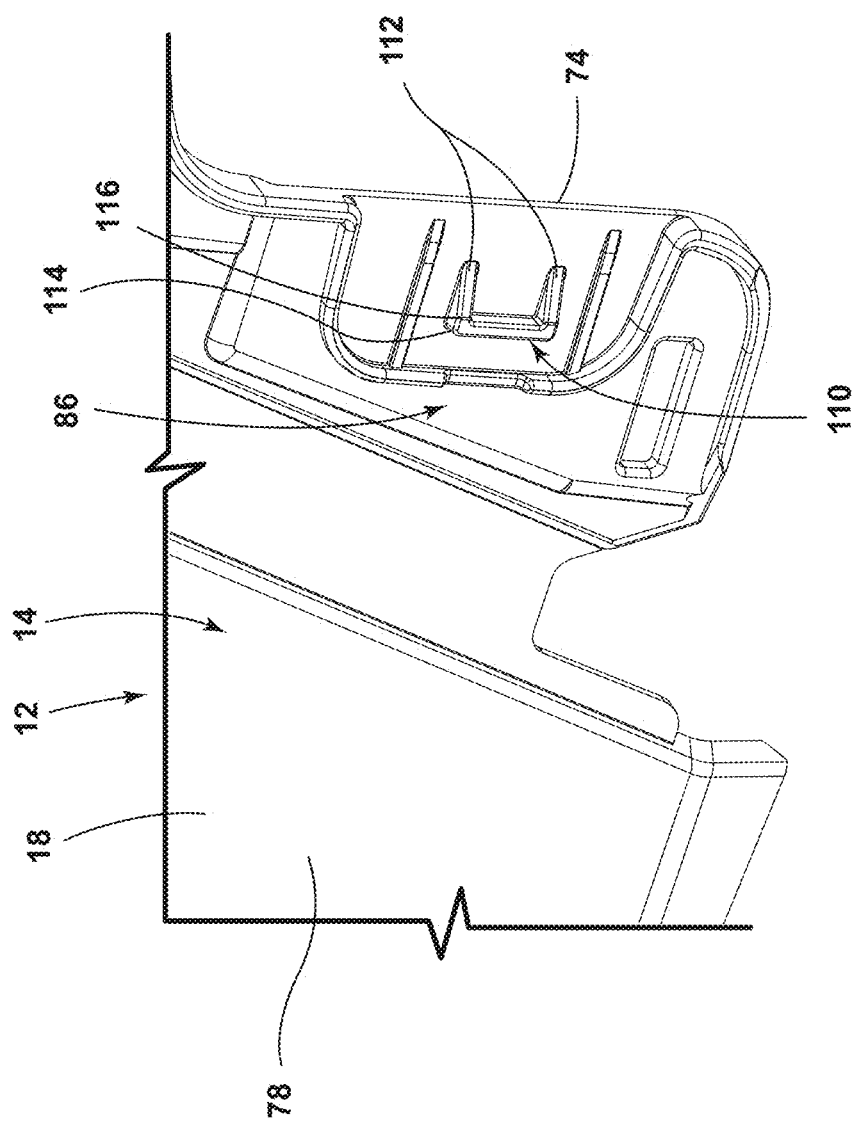
FIG. 8 is an enlarged perspective view of a portion of the unitary main body shown in FIG. 4, illustrating a protrusion coupled to an exterior surface of a side wall of the unitary main body of the console assembly, according to one embodiment.

In some embodiments, the receiving aperture 108 defined by the tab 100 of the first attachment feature 94 may be matingly engaged by a protrusion 110 that extends outward from the exterior surface 72 of the first side wall 16. For example, in the embodiment illustrated in FIG. 13, the protrusion 110 extends outward from the overlapped portion 86 of the exterior surface 72 of the first side wall 16 and includes an angled portion 112 and a stop portion 114. The angled portion 112 of the protrusion 110 extends away from the first side wall edge 68 from the exterior surface 72 of the first side wall 16 to a corner 116 of the protrusion 110 that is spaced apart from the exterior surface 72 adjacent to the protrusion 110. As such, the angled portion 112 slopes outward from the exterior surface 72 of the first side wall 16 as the angled portion 112 extends away from the first side wall edge 68 toward the corner 116. The stop portion 114 of the protrusion 110 extends from the corner 116 to the exterior surface 72 of the first side wall 16 in a direction that is generally perpendicular to the exterior surface 72 of the first side wall 16. In various embodiments, the exterior surface 78 of the second side wall 18 may include the protrusion 110, as described above in reference to the exterior surface 72 of the first side wall 16. For example, as illustrated in FIG. 8, the overlapped portion 86 of the exterior surface 78 of the second side wall 18 includes the protrusion 110 having the angled portion 112 extend away from the second side wall edge 74 to the corner 116 and the stop portion 114 extending from the corner 116 back to the exterior surface 78 of the second side wall 18.

In the exemplary embodiment of the cross bracket 42 and unitary main body 14 illustrated in FIGS. 12 and 13, during attachment of the cross bracket 42 to unitary main body 14, the tab 100 of the first attachment feature 94 undergoes resilient deformation to allow the protrusion 110 to enter the receiving aperture 108 defined by the tab 100. In various implementations, cross bracket 42 is initially positioned, such that the first side wall edge 68 is positioned within the gap 102 between the tab 100 and the support member 98. Next, the cross bracket 42 is moved relative to the unitary main body 14, such that the first portion 104 of the tab 100 travels toward the first side wall edge 68. As this movement of the cross bracket 42 occurs, the second portion 106 of the tab 100 encounters the angled portion 112 of the protrusion 110. The slope of the angled portion 112 causes the second portion 106 of the tab 100 to resiliently deform away from the support member 98 of the cross bracket 42 as the cross bracket 42 continues to move relative to the unitary main body 14. Finally, the movement of the cross bracket 42 causes the receiving aperture 108 defined by the tab 100 to align with the protrusion 110 extending out from the exterior surface 72 of the first side wall 16. The alignment allows the tab 100 to resiliently rebounds back toward an at rest position, which hooks the portion of the tab 100 that defines the receiving aperture 108 on the stop portion 114 of the protrusion 110. In this way, the cross bracket 42 is secured to the first side wall 16 of the unitary main body 14. Although not shown in FIGS. 12 and 13, in various embodiments, the second attachment feature 96 may be attached to the protrusion 110 extend outward from the exterior surface 78 of the second side wall 18, in the same manner described above in reference to the first attachment feature 94. The first and/or second attachment features 94, 96 may be coupled to the first and/or second side walls 16, 18 in a variety of ways, in various implementations.

In various embodiments, the first side panel 38 is coupled to the exterior surface 72 of the first side wall 16, such that the portion of the first attachment feature 94 that contacts the exterior surface 72 of the first side wall 16 is concealed by the first side panel 38. For example, as illustrated in FIGS. 12 and 13, the tab 100 of the first attachment feature 94 is coupled to the recessed overlapped portion 86 of the exterior surface 72 of the first side wall 16 that the first side panel 38 is configured to extend over and be coupled to in the assembled condition of the console assembly 12. As such, the first side panel 38 conceals the portion of the tab 100 that contacts the exterior surface 72 of the first side wall 16, as illustrated in FIG. 2. In this way, a portion of the cross bracket 42 (i.e., the second portion 106 of the tab 100) may be positioned between the first side panel 38 and the first side wall 16 of the unitary main body 14. Similarly, the portion of the cross bracket 42 (i.e., the second portion 106 of the tab 100 of the second attachment feature 96) may be positioned between the second side panel 40 and the second side wall 18 of the unitary main body 14.

The present disclosure may provide a variety of advantages. First, the main body 14 being a unitary main body 14 may decrease the number of parts necessary to construct the console assembly 12 and the expenses involved with manufacturing the console assembly 12. In particular, it is notable that the unitary main body 14 includes both the main receptacle portion 22 and the top finish portion 30, as conventional manufacturing methods of console assemblies necessitate separate components for a main receptacle of the console assembly 12 and a top finish panel. Second, the cross bracket 42 provides structural integrity to the unitary main body 14, which allows the console assembly 12 to omit a traditional floor-mounted base. Third, the first and second side panels 38, 40 overlapping the portion of the exterior surfaces 72, 78 of the first and second side walls 16, 18 that the cross bracket 42 is coupled to conceals the cross bracket 42 from the view of occupants within a vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A console assembly for a vehicle, comprising:
   a unitary main body comprising:
      a first side wall;
      a second side wall; and
      an intermediate structure that extends between the first and second side walls, the intermediate structure comprising:
         a main receptacle portion that defines a main storage cavity between the first and second side walls;
         a media receptacle portion that defines a media storage cavity between the first and second side walls; and
         a top finish portion positioned between the main receptacle portion and the media receptacle portion, wherein the top finish portion extends between the first and second side walls and defines at least one of a shifter receiving aperture and a cup holder opening;
   a door coupled to the unitary main body and operable between a closed position, wherein the door covers an opening to the main storage cavity, and an open position, wherein access to the main storage cavity is provided via the opening;
   a first side panel coupled to the first side wall;
   a second side panel coupled to the second side wall; and
   a cross bracket coupled to and extending between the first and second side walls, wherein at least a portion of the cross bracket is positioned between the first side wall and the first side panel.

2. The console assembly of claim 1, wherein the first side wall extends from the intermediate structure to a first side wall edge that separates an interior surface of the first side wall from an exterior surface of the first side wall, and the cross bracket is coupled to the first side wall, such that a portion of the cross bracket extends over a portion of the first side wall edge.

3. The console assembly of claim 2, wherein the cross bracket comprises:
 a first attachment feature operably coupled to the first side wall;
 a second attachment feature operably coupled to the second side wall; and
 a support member extending between the first and second attachment features, wherein the first attachment feature is coupled to the first side wall, such that the first attachment feature contacts the exterior surface of the first side wall.

4. The console assembly of claim 3, wherein the first attachment feature comprises:
 a tab extending outward from the support member to define a gap between the tab and the support member, wherein the first attachment feature is configured to be coupled to the first side wall, such that the first side wall edge is disposed within the gap between the tab and the support member, and the tab contacts the exterior surface of the first side wall.

5. The console assembly of claim 4, wherein the tab defines a receiving aperture configured to receive a protrusion defined by the exterior surface of the first side wall.

6. The console assembly of claim 3, wherein the first side panel is coupled to the exterior surface of the first side wall, such that the portion of the first attachment feature that contacts the exterior surface of the first side wall is concealed by the first side panel.

7. The console assembly of claim 1, wherein the cross bracket is suspended between the first and second side walls.

8. A console assembly for a vehicle, comprising:
 a unitary main body comprising:
  a first side wall;
  a second side wall; and
  a top finish portion that extends between the first and second side walls and defines at least one of a shifter receiving aperture and a cup holder opening, wherein the first side wall extends from the top finish portion to a first side wall edge that separates an interior surface of the first side wall from an exterior surface of the first side wall; and
 a cross bracket coupled to and extending between the first and second side walls, wherein the cross bracket contacts the exterior surface of the first side wall.

9. The console assembly of claim 8, wherein the cross bracket comprises:
 a first attachment feature operably coupled to the first side wall;
 a second attachment feature operably coupled to the second side wall; and
 a support member extending between the first and second attachment features, wherein the first attachment feature is coupled to the first side wall, such that the first attachment feature contacts the exterior surface of the first side wall.

10. The console assembly of claim 9, wherein the first attachment feature comprises:
 a tab extending outward from the support member to define a gap between the tab and the support member, wherein the first attachment feature is configured to be coupled to the first side wall, such that the first side wall edge is disposed within the gap between the tab and the support member, and the tab contacts the exterior surface of the first side wall.

11. The console assembly of claim 10, wherein the tab defines a receiving aperture configured to receive a protrusion defined by the exterior surface of the first side wall.

12. The console assembly of claim 8, wherein the cross bracket is suspended between the first and second side walls.

13. A console assembly for a vehicle, comprising:
 a unitary main body, comprising:
  a top finish portion;
  a first side wall extending from the top finish portion to a first side wall edge that separates an interior surface of the first side wall from an exterior surface of the first side wall; and
  a second side wall extending from the top finish portion to a second side wall edge that separates an interior surface of the second side wall from an exterior surface of the second side wall, wherein the interior surfaces of the first and second side walls face toward each other, and the exterior surfaces of the first and second side walls face away from each other; and
 a cross bracket coupled to the first and second side walls and extending there-between, wherein the cross bracket extends over a portion of the first side wall edge and along the exterior surface of the first side wall away from the first side wall edge.

14. The console assembly of claim 13, wherein the cross bracket comprises:
 a first attachment feature operably coupled to the first side wall;
 a second attachment feature operably coupled to the second side wall; and
 a support member extending between the first and second attachment features, wherein the first attachment feature is coupled to the first side wall, such that the first attachment feature contacts the exterior surface of the first side wall, and the second attachment feature is coupled to the second side wall, such that the second attachment feature contacts the exterior surface of the second side wall.

15. The console assembly of claim 14, wherein the first attachment feature comprises:
 a tab extending outward from the support member to define a gap between the tab and the support member, wherein the first attachment feature is configured to be coupled to the first side wall, such that the first side wall edge is disposed within the gap between the tab and the support member, and the tab contacts the exterior surface of the first side wall.

16. The console assembly of claim 15, wherein the tab defines a receiving aperture configured to receive a protrusion defined by the exterior surface of the first side wall.

17. The console assembly of claim 14, wherein the support member is positioned between the interior surfaces of the first and second side walls, respectively.

18. The console assembly of claim 13, wherein the cross bracket is suspended between the first and second side walls.

* * * * *